United States Patent
Timonen et al.

(10) Patent No.: US 11,030,817 B2
(45) Date of Patent: Jun. 8, 2021

(54) DISPLAY SYSTEM AND METHOD OF USING ENVIRONMENT MAP TO GENERATE EXTENDED-REALITY IMAGES

(71) Applicant: Varjo Technologies Oy, Helsinki (FI)

(72) Inventors: Petteri Timonen, Helsinki (FI); Ville Timonen, Espoo (FI)

(73) Assignee: Varjo Technologies Oy, Helsinki (FI)

( * ) Notice: Subject to any disclaimer, the term of this patent is extended or adjusted under 35 U.S.C. 154(b) by 50 days.

(21) Appl. No.: 16/674,136

(22) Filed: Nov. 5, 2019

(65) Prior Publication Data

US 2021/0134061 A1 May 6, 2021

(51) Int. Cl.
*G06T 19/00* (2011.01)
*G06F 3/01* (2006.01)
*H04N 5/235* (2006.01)
*G06T 7/00* (2017.01)
*G06T 7/55* (2017.01)

(52) U.S. Cl.
CPC ............ *G06T 19/006* (2013.01); *G06F 3/012* (2013.01); *G06F 3/013* (2013.01); *G06T 7/55* (2017.01); *G06T 7/97* (2017.01); *H04N 5/2353* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 10,551,913 B2 * | 2/2020 | McCombe | ............... | G06F 3/012 |
| 2016/0027215 A1 * | 1/2016 | Burns | ..................... | G06F 3/011 |
| | | | | 345/419 |
| 2016/0350976 A1 * | 12/2016 | Yamaguchi | .......... | H04N 5/2353 |
| 2018/0307310 A1 * | 10/2018 | McCombe | ........... | H04N 13/243 |

(Continued)

OTHER PUBLICATIONS

"Robust Relocalization and Its Evaluation for Online Environment Map Construction", by Sehwan Kim, Christopher Coffin, and Tobias Höllerer, IEEE Transactions on Visualization and Computer Graphics, vol. 17, No. 7, pp. 875-887, Jul. 2011. (Year: 2011).*

(Continued)

*Primary Examiner* — James A Thompson
(74) *Attorney, Agent, or Firm* — Ziegler IP Law Group, LLC

(57) ABSTRACT

A display system including display or projector, camera, means for tracking position and orientation of user's head, and processor. The processor is configured to control camera to capture images of real-world environment using default exposure setting, whilst processing head-tracking data to determine corresponding positions and orientations of user's head with respect to which images are captured; process images to create environment map of real-world environment; generate extended-reality image from images using environment map; render extended-reality image; adjust exposure of camera to capture underexposed image of real-world environment; process images to generate derived image; generate next extended-reality image from derived image using environment map; render next extended-reality image; and identify and modify intensities of oversaturated (Continued)

pixels in environment map, based on underexposed image and position and orientation with respect to which underexposed image is captured.

18 Claims, 4 Drawing Sheets

(56) References Cited

U.S. PATENT DOCUMENTS

2019/0289284 A1* 9/2019 Smith ................ A61B 1/00193
2019/0325600 A1* 10/2019 Balan ........................ G06T 7/70
2019/0354173 A1* 11/2019 Young ................... G06F 1/3231

OTHER PUBLICATIONS

"Enhanced Natural Visual Perception for Augmented Reality-Workstations by Simulation of Perspective", by Rafael Radkowski and James Oliver, Journal of Display Technology, vol. 10, No. 5, pp. 333-344, May 2014. (Year: 2014).*

* cited by examiner

DISPLAY SYSTEM AND METHOD OF USING ENVIRONMENT MAP TO GENERATE EXTENDED-REALITY IMAGES

TECHNICAL FIELD

The present disclosure relates generally to display systems; and more specifically, to display systems comprising displays or projectors, cameras, means for tracking position and orientation of user's head, and processors. Moreover, the present disclosure also relates to methods pertaining to said display systems.

BACKGROUND

Presently, several technologies (for example, such as virtual reality (VR), augmented reality (AR), mixed reality (MR) and the like) are being used to present interactive extended-reality environments to users. Specifically, such extended-reality environments) as well as real-world environments having virtual objects therein (namely, augmented reality environments, mixed-reality environments, and the like). Typically, the users utilize specialized extended-reality devices (for example, such as a virtual reality device, an augmented reality device, a mixed reality device, and the like) for experiencing and interacting with such extended-reality environments. In use, the user generally wears (namely, supports) the specialized extended-reality device on his/her head. Moreover, the user moves his/her head to 'look around' within the extended-reality environment.

When an extended-reality environment is one where virtual object are overlaid on a given real-world environment, a video see-through arrangement for viewing the given real-world environment is provided at the specialized extended-reality devices. Nowadays, environment mapping is used to create such an extended-reality environment. Generally, dedicated equipment is employed for capturing images of the given real-world environment and using the captured images to create an environment map of the given real-world environment.

However, existing dedicated equipment has certain limitations associated therewith. Firstly, the dedicated equipment is unable to generate and update the environment map in real time. Secondly, when the dedicated equipment is used to capture High-Dynamic-Range (HDR) images for environment mapping, the captured images are often either overexposed or underexposed. This is due to the fact that the given real-world environment includes both bright and dark sources of light, and calculating accurate intensities for such varied sources of light is difficult. As an example, when an image of a bulb in the given real-world environment is captured using a regular exposure for environment mapping, pixels of the image that correspond to the bulb and a region in vicinity of the bulb are oversaturated. In such a case, lowering the exposure to capture the image is also not a viable solution, as then a video feed of the given real-world environment through the video see-through arrangement would appear too dark. When the captured images have incorrect exposure, they do not accurately depict visual detail in the given real-world environment, due to which digitally provided real-world lighting effect and reflection effect within the extended-reality environment appear unrealistic and suboptimal.

Therefore, in light of the foregoing discussion, there exists a need to overcome the aforementioned drawbacks associated with specialized equipment for generating the HDR images for environment mapping.

SUMMARY

The present disclosure seeks to provide a display system. The present disclosure also seeks to provide a method. The present disclosure seeks to provide a solution to the existing problem of determining accurate intensities for bright sources of light in a real-world environment, whilst generating HDR environment maps for the real-world environment. An aim of the present disclosure is to provide a solution that overcomes at least partially the problems encountered in prior art, and provides an efficient and user-friendly display system that generates and renders extended-reality images that are optimized according to light sources of various intensities within the real-world environment.

In one aspect, an embodiment of the present disclosure provides a display system comprising:
at least one display or projector;
at least one camera;
means for tracking a position and orientation of a user's head; and
at least one processor configured to:
control the at least one camera to capture a plurality of images of a real-world environment using a default exposure setting of the at least one camera, whilst processing head-tracking data obtained from said means to determine corresponding positions and orientations of the user's head with respect to which the plurality of images are captured;
process the plurality of images, based on the corresponding positions and orientations of the user's head, to create an environment map of the real-world environment;
generate at least one extended-reality image from at least one of the plurality of images using the environment map;
render, via the at least one display or projector, the at least one extended-reality image;
adjust an exposure of the at least one camera to capture at least one underexposed image of the real-world environment, whilst processing corresponding head-tracking data obtained from said means to determine a corresponding position and orientation of the user's head with respect to which the at least one underexposed image is captured;
process the at least one of the plurality of images, based on a translational and rotational difference between a position and orientation of the user's head with respect to which the at least one of the plurality of images is captured and the position and orientation with respect to which the at least one underexposed image is captured, to generate at least one derived image;
generate at least one next extended-reality image from the at least one derived image using the environment map;
render, via the at least one display or projector, the at least one next extended-reality image; and
identify oversaturated pixels in the environment map and modify intensities of the oversaturated pixels in the environment map, based on the at least one underexposed image and the position and orientation with respect to which the at least one underexposed image is captured.

In another aspect, an embodiment of the present disclosure provides a method comprising:
capturing a plurality of images of a real-world environment using a default exposure setting of at least one camera, whilst processing head-tracking data to determine corresponding positions and orientations of a user's head with respect to which the plurality of images are captured;

processing the plurality of images, based on the corresponding positions and orientations of the user's head, to create an environment map of the real-world environment;

generating at least one extended-reality image from at least one of the plurality of images using the environment map;

rendering, via at least one display or projector, the at least one extended-reality image;

adjusting an exposure of the at least one camera to capture at least one underexposed image of the real-world environment, whilst processing corresponding head-tracking data to determine a corresponding position and orientation of the user's head with respect to which the at least one underexposed image is captured;

processing the at least one of the plurality of images, based on a translational and rotational difference between a position and orientation of the user's head with respect to which the at least one of the plurality of images is captured and the position and orientation with respect to which the at least one underexposed image is captured, to generate at least one derived image;

generating at least one next extended-reality image from the at least one derived image using the environment map;

rendering, via the at least one display or projector, the at least one next extended-reality image; and identifying oversaturated pixels in the environment map and modifying intensities of the oversaturated pixels in the environment map, based on the at least one underexposed image and the position and orientation with respect to which the at least one underexposed image is captured.

Embodiments of the present disclosure substantially eliminate or at least partially address the aforementioned problems in the prior art, and enable generation of optimal extended-reality images (that optimally represent visual detail of bright and dark regions of a real-world environment) to be rendered at a display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
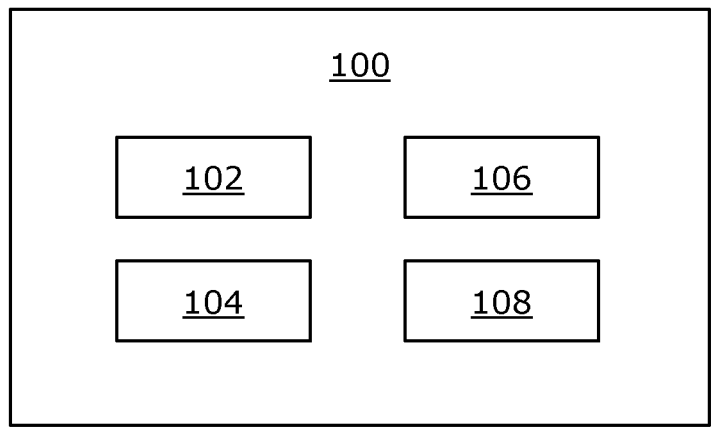
FIGS. 1 and 2 illustrate block diagrams of architectures of a display system, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display system comprising:
at least one display or projector;
at least one camera;
means for tracking a position and orientation of a user's head; and
at least one processor configured to:
control the at least one camera to capture a plurality of images of a real-world environment using a default exposure setting of the at least one camera, whilst processing head-tracking data obtained from said means to determine corresponding positions and orientations of the user's head with respect to which the plurality of images are captured;
process the plurality of images, based on the corresponding positions and orientations of the user's head, to create an environment map of the real-world environment;
generate at least one extended-reality image from at least one of the plurality of images using the environment map;
render, via the at least one display or projector, the at least one extended-reality image;
adjust an exposure of the at least one camera to capture at least one underexposed image of the real-world environment, whilst processing corresponding head-tracking data obtained from said means to determine a corresponding position and orientation of the user's head with respect to which the at least one underexposed image is captured;
process the at least one of the plurality of images, based on a translational and rotational difference between a position and orientation of the user's head with respect to which the at least one of the plurality of images is captured and the position and orientation with respect to which the at least one underexposed image is captured, to generate at least one derived image;
generate at least one next extended-reality image from the at least one derived image using the environment map;
render, via the at least one display or projector, the at least one next extended-reality image; and
identify oversaturated pixels in the environment map and modify intensities of the oversaturated pixels in the environment map, based on the at least one underexposed image and the position and orientation with respect to which the at least one underexposed image is captured.

In another aspect, an embodiment of the present disclosure provides a method comprising:

capturing a plurality of images of a real-world environment using a default exposure setting of at least one camera, whilst processing head-tracking data to determine corresponding positions and orientations of a user's head with respect to which the plurality of images are captured;

processing the plurality of images, based on the corresponding positions and orientations of the user's head, to create an environment map of the real-world environment;

generating at least one extended-reality image from at least one of the plurality of images using the environment map;

rendering, via at least one display or projector, the at least one extended-reality image;

adjusting an exposure of the at least one camera to capture at least one underexposed image of the real-world environment, whilst processing corresponding head-tracking data to determine a corresponding position and orientation of the user's head with respect to which the at least one underexposed image is captured;

processing the at least one of the plurality of images, based on a translational and rotational difference between a position and orientation of the user's head with respect to which the at least one of the plurality of images is captured and the position and orientation with respect to which the at least one underexposed image is captured, to generate at least one derived image;

generating at least one next extended-reality image from the at least one derived image using the environment map;

rendering, via the at least one display or projector, the at least one next extended-reality image; and identifying oversaturated pixels in the environment map and modifying intensities of the oversaturated pixels in the environment map, based on the at least one underexposed image and the position and orientation with respect to which the at least one underexposed image is captured.

The present disclosure provides the aforementioned display system and the aforementioned method. The extended-reality images produced by the display system are perspective-correct and realistic since the display system efficiently utilizes the head-tracking data to generate said extended-reality images. As a result, when the user is presented the extended-reality images generated by the at least one processor, the user experiences considerable immersion within an extended-reality environment. Moreover, the extended-reality images produced by the display system represent optimal visual detail for regions with different lighting levels within the real-world environment. Therefore, real-world lighting effect and reflection effect can be optimally applied to the extended-reality images for improving realism therein. The display system implements processing-based adjustments to provide the user with an enhanced realistic extended-reality experience. Beneficially said adjustments are made in real time or near-real time, and therefore imperceptible to the user. Moreover, the method described herein is computationally efficient and is performed in real time or near-real time. In particular, the environment map is generated and updated in real time or near-real time.

Throughout the present disclosure, the term "display system" refers to a specialized system that is configured to generate a sequence of extended-reality images for a display apparatus. It will be appreciated that the display system generates said sequence of extended-reality images in real time or near-real time.

Throughout the present disclosure, the term "display apparatus" refers to a specialized equipment that is configured to present the sequence of extended-reality images to the user when the display apparatus, in operation, is worn by the user on his/her head. In such an instance, the display apparatus acts as a device (for example, such as an augmented reality headset, a pair of augmented reality glasses, a mixed reality headset, a pair of mixed reality glasses, and the like) that is operable to present a visual scene of an extended-reality environment to the user. The display apparatus may also commonly be referred to as "head-mounted display apparatus".

It will be appreciated that the term "extended-reality" encompasses virtual reality, augmented reality, mixed reality, and the like.

In some implementations, the display system is implemented as a display apparatus and an external means for tracking the position and orientation of the user's head. In such a case, the external means for tracking the position and orientation may, for example, be an infrared (IR)-based head pose tracking means (for example, such as a SteamVR® lighthouse), at least one detector that detects at least one detectable object, and the like.

In other implementations, the display system is implemented as a display apparatus, an external means for tracking the position and orientation of the user's head, and an external computing device. In such a case, at least some processing tasks of the at least one processor are performed at the external computing device. In such a case, at least one processor of the external computing device is coupled to at least one processor of the display apparatus, wirelessly and/or in a wired manner. It will be appreciated that performing some processing tasks at the at least one processor of the external computing device may be beneficial as it would considerably reduce processing burden on the at least one processor of the display apparatus.

In yet other implementations, the display system could be implemented as a standalone display apparatus, wherein the display apparatus comprises the means for tracking the position and orientation of the user's head. In such a case, the means for tracking the position and orientation may be, for example, an inertial measurement unit (IMU), a timing and inertial measurement unit, and the like.

Throughout the present disclosure, the term "display" refers to equipment that, in operation, displays the sequence of extended-reality images that are to be shown to the user of the display apparatus, whereas the term "projector" refers to equipment that, in operation, projects the sequence of extended-reality images that are to be shown to the user of the display apparatus. Optionally, when the display apparatus comprises at least one projector, the sequence of extended-reality images is projected by the at least one projector onto a projection screen. The at least one display or projector is a component of the display apparatus. It will be appreciated that the term "at least one display or projector" refers to "one display or projector" in some implementations, and "a plurality of displays or projectors" in other implementations.

In some implementations, the at least one display or projector comprises at least one first display or projector for a left eye of the user and at least one second display or projector for a right eye of the user. In other implementations, the at least one display or projector comprises a single display or projector that is used on a shared basis for both eyes of the user.

Optionally, the at least one display or projector comprises at least one context display or projector and at least one focus display or projector. Optionally, in this regard, the at least one display or projector is implemented as a Fovea Contingent Display (FCD) or a Fovea Contingent Projector (FCP) that, in operation, renders a foveated visual scene of the extended-reality environment. Optionally, the at least one context display or projector has a first display resolution and the at least one focus display or projector has a second display resolution, the first display resolution being lower than the second display resolution. It will be appreciated that the FCD or the FCP is designed to imitate a physiology of human vision. The FCD or the FCP allows for increasing immersion and realism within the extended-reality environment.

Optionally, a given display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, a given projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Throughout the present disclosure, the term "camera" refers to equipment that is operable to detect and process light from the real-world environment, so as to capture images of the real-world environment. Optionally, the at least one camera comprises a camera chip, wherein the light from the real-world environment is directed by at least one optical element of the at least one camera onto a photosensitive surface of the camera chip, thereby enabling the at least one camera to capture the images of the real-world environment. It will be appreciated that the term "at least one camera" refers to "one camera" in some implementations, and "a plurality of cameras" in other implementations.

In some implementations, the at least one camera comprises a single camera for capturing the images of the real-world environment. Optionally, the at least one camera is a single camera that is configured to capture, at a given time, a single image of the given real-world environment, the single image being displayed or projected by the at least one display or projector, and then being reflected using an arrangement of optical elements (for example, such as mirrors) to focus slightly offset parts of the single image onto the left and right eyes of the user. In such a case, the single image has a large field of view (FOV), which is utilized to generate a pair of stereo images for the left and right eyes of the user. Alternatively, optionally, the at least one camera is a stereo camera having at least two lenses with a dedicated camera chip per lens. In such a case, the stereo camera captures at least two offset images of the real-world environment.

In other implementations, the at least one camera may comprise a plurality of cameras (namely, two or more cameras) for capturing the images of the real-world environment.

It will be appreciated that the at least one camera is arranged to capture the images of the real-world environment from a perspective of the user's eyes. In other words, the images captured by the at least one camera is utilized to provide a video see-through (VST) experience to the user. The at least one camera is arranged on an outer surface of the display apparatus, in a manner that the at least one camera faces the real-world environment.

Optionally, a given camera is implemented as at least one of: a Red-Green-Blue (RGB) camera, an RGB-Depth (RGB-D) camera, a stereo camera, a plenoptic camera.

Throughout the present disclosure, the term "means for tracking the position and orientation of the user's head" refers to specialized equipment for detecting and/or following the position and orientation of the user's head within the real-world environment, when the display apparatus is worn by the user on his/her head. In particular, the means for tracking the position and orientation of the user's head actually tracks a position and orientation of the display apparatus, which corresponds to the position and orientation of the user's head. The means for tracking the position and orientation of the user's head tracks a pose of the user's head, wherein the term "pose" encompasses both position and orientation.

The means for tracking the position and orientation of the user's head is a true six Degrees of Freedom (6DoF) tracking system. Notably, said means tracks both the position and the orientation of the user's head in three dimensions. In particular, said means is configured to track translational movements (namely, surge, heave and sway movements) and rotational movements (namely, roll, pitch and yaw movements) of the user's head within a three-dimensional space of the real-world environment. It will be appreciated that use of said means in the display apparatus allows for providing a truly immersive extended-reality experience to the user by enabling adjustment of the visual scene (by the at least one processor) according to a current pose of the user's head. This provides a realistic perception of the extended-reality environment to the user.

It will be appreciated that the means for tracking the position and orientation of the user's head could be implemented as an internal component of the display apparatus or as an external means for tracking.

Optionally, the means for tracking the position and orientation of the user's head is implemented as at least one of: an accelerometer, a gyroscope, an Inertial Measurement Unit (IMU), a timing and inertial measurement unit, and the like. Such means for tracking the position and orientation of the user's head are arranged in the display apparatus.

Optionally, the means for tracking the position and orientation of the user's head is implemented as at least one detector for detecting at least one detectable object. When the at least one detectable object is arranged in the real-world environment, the at least one detector is arranged on the display apparatus, and vice versa. Optionally, in this regard, the at least one detectable object is implemented as at least one marker (for example, such as an active IR light-emitting diode, a visible light-emitting diode, a laser illuminator a Quick Response (QR) code, an ArUco marker, an Radio Frequency Identification (RFID) marker, and the like), whereas the at least one detector is implemented as at least one of: an IR camera, an IR transceiver, a visible light camera, a RFID Reader.

In an example, the means for tracking the position and orientation of the user's head may be implemented as Valve Corporation's SteamVR® tracking, where active lighthouses (namely, detectable objects) sending infrared signals are installed at fixed locations in the real-world environment where the display apparatus is being used. In such an example, the display apparatus has detectors that detect these infrared signals and determine the pose (namely, the position and orientation) of the display apparatus relative to the fixed locations of the lighthouses. Such a manner of tracking head pose is referred to as "outside-in head tracking".

In another example, the means for tracking the position and orientation of the user's head may be implemented as an inside-out tracking technique (for example, such as Intel® RealSense™ technology) which employs outward-facing cameras (detectors) specifically designed for the purpose of tracking movement of visual features visible to the cameras. Moreover, the at least one camera that provides the VST experience can also be used to track pose of the display apparatus. Such a technique finds visible features from consecutive camera images, and fits poses of the display apparatus to image frames so that the movement and location of the visible features is best explained.

In yet another example, the means for tracking the position and orientation of the user's head may be implemented as a magnetic tracking system (for example, such as magnetic tracking from Polhemus), where an active magnetic field is generated using a transmitter in the real-world environment, and at least one receiver that is capable of sensing the magnetic field is installed into the display apparatus.

In still another example, the means for tracking the position and orientation of the user's head may be implemented as an optical outside-in tracking technique (for example, such as, OptiTrack™ and ART tracking) where the display apparatus is fitted with IR retroreflective markers or IR light emitting diodes, and at least one IR camera is installed in the real-world environment to capture IR light reflected from the markers or emitted by the IR light emitting diodes, and infer the pose of the display apparatus visually.

Throughout the present disclosure, the term "processor" refers to hardware, software, firmware or a combination of these, suitable for controlling the operation of the display system. The at least one processor is communicably coupled to the at least one display or projector, the at least one camera and the means for tracking the position and orientation of the user's head wirelessly and/or in wired manner. In some implementations, the at least one processor may be implemented as a processor of the display apparatus. In other implementations, the at least one processor may be implemented as at least one processor of the display apparatus and at least one processor of an external computing device, wherein the at least one processor of the external computing device is communicably coupled to the at least one processor of the display apparatus.

It will be appreciated that the term "at least one processor" refers to "one processor" in some implementations, and "a plurality of processors" in other implementations.

The at least one camera is controlled to capture the plurality of images of the real-world environment using the default exposure setting of the at least one camera. Notably, the default exposure setting of the at least one camera is defined by a default aperture setting, a default sensitivity (namely, gain or ISO) setting and a default shutter speed setting of the at least one camera. The default shutter speed setting defines a default exposure time setting of the at least one camera, as shutter speed is inversely related to exposure time. The default exposure setting of the at least one camera also encompasses auto-exposure settings of the at least one camera.

Whilst capturing the plurality of images of the real-world environment using the default exposure setting, the head-tracking data is processed to determine corresponding positions and orientations of the user's head with respect to which the plurality of images are captured. The at least one processor repeatedly obtains the head-tracking data from the means for tracking the position and orientation of the user's head as the user's head pose keeps changing whilst he/she uses the display apparatus. Notably, the "head-tracking data" is indicative of the position and orientation of the user's head at various time instants. The head-tracking data is processed to determine the corresponding positions and orientations of the user's head with respect to which the plurality of images are captured. An up-to-date information indicative of the user's head pose allows for producing an up-to-date extended-reality environment for the display apparatus.

Optionally, the at least one processor is configured to store the plurality of images along with information indicative of the corresponding positions and orientations of the user's head with respect to which the plurality of images are captured.

The plurality of images is processed, based on the corresponding positions and orientations of the user's head, to create the environment map of the real-world environment. Throughout the present disclosure, the term "environment map" refers to a three-dimensional representation of the real-world environment. In particular, the environment map is a full 360-degree view of the real-world environment surrounding the user. It will be appreciated that the real-world environment may be changing (for example, during sunrise/sunset) with time. Therefore, new environment maps are created and updated repeatedly. Therefore, the environment map of the real-world environment is generated in an iterative manner. The creation of the environment map of the real-world environment is an ongoing process, wherein an initial version of the environment map of the real-world environment is enhanced using the plurality of images captured by the at least one camera.

Optionally, the plurality of images are merged to create the environment map, wherein merging of the plurality of images is performed based on the corresponding positions and orientations of the user's head. Optionally, in this regard, a given image corresponding to a given position and orientation of the user's head is merged with images that correspond to positions that are same as, adjacent to, or in proximity of the given position. Optionally, the at least one processor employs at least one of: an image merging algorithm, an image stitching algorithm, to merge the plurality of images.

It will be appreciated that creation of the environment map is an extremely useful processing step, as the environment map is used to generate the sequence of extended-reality images in a manner that extended-reality images of said sequence are realistic, perspective-correct and immersive.

The at least one processor is configured to generate the at least one extended-reality image from the at least one of the plurality of images using the environment map. The term "extended-reality image" refers to an image of an extended-reality view to be presented to the user. It will be appreciated that the extended-reality view depicts at least one virtual object. Moreover, the environment map is used for adding real-world lighting, reflections as well as refractions to the at least one virtual object in the extended-reality view.

Optionally, the at least one extended-reality image is representative of the at least one virtual object embedded in the real-world environment. In such a case, the extended-reality view is an augmented-reality view, a mixed-reality view, and the like. Alternatively, optionally, the at least one extended-reality image is representative of the at least one virtual object only. In such a case, the extended-reality view is a virtual reality view.

It will be appreciated that one or more images amongst the plurality of images are used to generate the at least one extended-reality image. As an example, a latest image from amongst the plurality of images may be used to generate the at least one extended-reality image.

The at least one processor is configured to render, via the at least one display or projector, the at least one extended-reality image. The at least one extended-reality image presents the extended-reality view to the user. A sequence of extended-reality images, when rendered at the display apparatus, presents the visual scene of the extended-reality environment to the user. The user experiences a sense of realism and immersion within said extended-reality environment.

The at least one processor is configured to adjust the exposure of the at least one camera to capture the at least one underexposed image of the real-world environment, whilst processing corresponding head-tracking data obtained from said means to determine the corresponding position and orientation of the user's head with respect to which the at least one underexposed image is captured. Throughout the present disclosure, the term "exposure" refers to a characteristic (namely, a property) of the at least one camera, that encompasses various characteristics of the at least one camera for example, such as a shutter speed (namely, an exposure time), a sensitivity (namely, ISO or gain), and aperture.

Throughout, the present disclosure, the term "underexposed image" refers to an image of the real-world environment that is captured to have an exposure that is lesser than the default exposure with which the plurality of images are captured. Such an underexposed image depicts accurate visual detail of a bright portion within the real-world environment, which may not be clearly visible with the default exposure. Moreover, the at least one underexposed image is later used to modify the environment map.

Notably, the exposure of the at least one camera is adjusted on the basis of identified oversaturated pixels (namely, brighter pixels) in the environment map. Upon said adjustment, the at least one camera is configured to capture the at least one underexposed image according to a current position and orientation of the user's head in a manner that captured underexposed image closely represents how a portion of the real-world environment corresponding to the identified oversaturated pixels would appear with low lighting. It will be appreciated that the at least one underexposed image is not shown to the user.

It will be appreciated that the exposure of the at least one camera is adjusted to capture the at least one underexposed image by at least one of: increasing the shutter speed (namely, reducing the exposure time), lowering the sensitivity, reducing the aperture, of the at least one camera.

Throughout the present disclosure, the term "derived image" refers to an image that is derived from a camera image. In particular, a given derived image is generated based on the translational and rotational difference between a latest (correct-exposure) image from the plurality of images and a latest (underexposed) image from the at least one underexposed image. Notably, pixels of the latest (correct-exposure) image are extrapolated based on said translational and rotational difference to yield the given derived image. As a result, the given derived image conforms to a position and orientation of the user's head at a time of capturing the latest image, but depicts a different perspective of the real-world environment than the latest (correct-exposure) image. It will be appreciated that when the at least one derived image is subsequently used to generate the at least one next extended-reality image, the user does not experience video stuttering.

Throughout the present disclosure, the term "translational difference" refers to a translation from a previous position of the user's head to a given position of the user's head, and the term "rotational difference" refers to a rotation from a previous orientation of the user's head to a given orientation of the user's head. Herein, the term "previous position" refers to the position of the user's head with respect to which the at least one of the plurality of images is captured, and the term "previous orientation" refers to the orientation of the user's head with respect to which the at least one of the plurality of images is captured. Moreover, the term "given position" refers to the position of the user's head with respect to which the at least one underexposed image is captured, and the term "given orientation" refers to the orientation of the user's head with respect to which the at least one underexposed image is captured.

The at least one next extended-reality image is generated from the at least one derived image using the environment map. Notably, the at least one derived image is used to generate a next extended-reality view that is to be presented to the user. The next extended-reality view is generated using environment mapping in real time or near real time. It will be appreciated since the at least one derived image and the environment map are used to generate the at least one next extended-reality image, the at least one next extended-reality image clearly depicts visual details of the portion of the real-world environment corresponding to the identified oversaturated pixels in the environment map. As a result, the at least one virtual object depicted in the at least one next extended-reality image would have realistic visual attributes of reflections, shadows, and the like, and would thus appear more convincing to the user of the display apparatus.

The at least one processor is configured to render, via the at least one display or projector, the at least one next extended-reality image. The at least one next extended-reality image presents a next extended-reality view to the user. A sequence of extended-reality views constitutes the visual scene of the extended-reality environment.

The at least one processor is configured to identify the oversaturated pixels in the environment map and modify the intensities of the oversaturated pixels in the environment map, based on the at least one underexposed image and the position and orientation with respect to which the at least one underexposed image is captured. Notably, the oversaturated pixels represent bright light sources (for example, sun, artificial lighting, and the like) in the real-world environment. When a given pixel segment is oversaturated, all the pixels in the given pixel segment have a maximum intensity. As a result, the given pixel segment loses some visual detail, and thus is not useful in terms of capturing visual detail of the real-world environment in the environment map. Optionally, the intensities of such oversaturated pixels are changed to correspond to intensity values of corresponding pixels in the at least one underexposed image. As a result, intensities for pixels representing the bright light sources in the real-world environment are updated in the environment map based on the at least one underexposed image. The modified environment map (having the modified (lower) intensities of oversaturated pixels) is used for accurately adding real-world lighting, reflections as well as refractions to the at least one virtual object in the at least one next extended-reality image.

Optionally, pixel segments in the environment map that have an intensity level that is higher than a threshold high-intensity level are identified as the pixel segments in the environment map that represent bright areas of the real-world environment. Optionally, the intensities of the identified pixel segments in the environment map are updated to correspond to intensity values of corresponding pixels in the at least one underexposed image. When the at least one derived image and the modified environment map are used to generate the at least one next extended-reality image, the at least one next extended-reality image clearly depicts visual details of the bright portion of the real-world environment.

In an example, the real-world environment may be a bright environment (for example, such as an outdoor backyard environment). In such an example, when the user is looking towards a bright window, a short exposure time may be used to capture the at least one underexposed image representing the bright window. Such a short exposure time would allow visual details of bright areas (notably, the bright window) to be captured in the at least one underexposed image.

It is to be appreciated that the environment map is modified in real time or near real time. Moreover, the at least one next extended-reality image is generated using environment mapping in real-time or near real-time. Such environment mapping techniques are well known in the art.

Optionally, said identification of the oversaturated pixels in the environment map and said modification of the intensities of the oversaturated pixels in the environment map is performed parallelly while generating the at least one derived image and the at least one next extended-reality image. Alternatively, optionally, said identification of the oversaturated pixels in the environment map and said modification of the intensities of the oversaturated pixels in the environment map is performed before the at least one next extended-reality image is generated, so that the at least one next extended-reality image is generated using the modified environment map.

Optionally, the display system further comprises means for tracking the user's eyes, wherein the at least one processor is configured to process eye-tracking data obtained from said means to detect when the user's eyes blink or saccade, wherein the at least one underexposed image is to be captured during a time period in which the user's eyes blink or saccade.

Throughout the present disclosure, the term "means for tracking the user's eyes" refers to specialized equipment for detecting and/or following the user's eyes. Notably, the "eye-tracking data" generated by the means for tracking the user's eyes is indicative of when the user's eyes blink or saccade. Optionally, the means for tracking the user's eyes is implemented by way of cameras monitoring the blinking or saccades of the user's eyes, IR based eye blinking sensors, and the like. Such means for tracking the user's eyes are well-known in the art. Beneficially, the means for tracking the user's eyes is arranged in a manner that said means does not cause any obstruction in an optical path of a projection of the sequence of extended-reality images rendered via the at least one display or projector.

It will be appreciated that the eye-tracking data is obtained repeatedly for a given display system as the user's eyes blink or saccade several times whilst he/she uses the display system. An up-to-date information indicative of when the user's eyes blinks or saccade allows for accurately capturing the at least one underexposed image during the time period in which the user's eyes blink or saccade. In such a time period, the user does not view the visual scene presented by the display system, and therefore, would not notice discontinuities in the visual scene that are introduced on account of capturing the at least one underexposed image.

Optionally, the means for tracking the user's eyes detects and/or follows gaze directions of the user's eyes. In such a case, the eye-tracking data is indicative of a region of the visual scene towards which the gaze directions of the user's eyes are focused. Such a region is commonly referred to as "region of interest".

Optionally, the at least one processor is configured to generate a depth map of the real-world environment from a perspective of the position and orientation of the user's head with respect to which the at least one of the plurality of images is captured, and wherein, when generating the at least one derived image, the at least one processor is configured to process the at least one of the plurality of images based on the depth map.

Throughout the present disclosure, the term "depth map" relates to a data structure comprising information pertaining to an optical depth of at least one real object within the given real-world environment. Optionally, the depth map is an image comprising a plurality of pixels, wherein a color of each pixel indicates optical depth of its corresponding point(s) within the given real-world environment. As an example, the depth map may be a grayscale image wherein each pixel is associated with a single monochromatic color having intensity ranging from black color (namely, maximum intensity) to white color (namely, minimum intensity), wherein a black colored-pixel depicts maximum optical depth (namely, largest optical distance) of its corresponding point within the given real-world environment, whilst a white colored pixel depicts minimum optical depth (namely, smallest optical distance) of its corresponding point within the given real-world environment.

It will be appreciated that the depth map is generated from the perspective of the position and orientation of the user's head with respect to which the at least one of the plurality of images is captured since the same perspective is to be utilized when generating the at least one derived image. As the optical depth of the at least one real object in the real-world environment would be known with respect to said perspective, the optical depth of the at least one real object can be accurately adjusted when extrapolating pixels of the at least one of the plurality of images according to yield the at least one derived image.

Furthermore, optionally, when generating the at least one derived image, the at least one processor is configured to add (namely, insert) at least one virtual object at a given optical depth using the depth map of the real-world environment. Such an addition is independent of the real-world environment, and, independent of the at least one real object within the given real-world environment.

Optionally, the display system further comprises means for generating the depth map of the given real-world environment. Throughout the present disclosure, the term "means for generating the depth map" refers to equipment and/or techniques configured to record and represent optical depth (namely, optical distance) of at least one real object within the given real-world environment. Said means provides a frame of reference from which the optical depth of the at least one real object can be extracted. In an example, the means for generating the depth map may be implemented as an infrared camera. In another example, the means for generating the depth map may be implemented as a structured-light scanner and a structured-light projector (for example, such as an infrared pattern projector). In yet another example, the means for generating the depth map may be implemented on a surveying device, wherein the surveying device may be arranged to move within the real world environment for (i) capturing the plurality of images of the given real-world environment using the at least one camera, and (ii) employing Simultaneous Localization and Mapping (SLAM) algorithm to process the captured images for generating the depth map of the given real-world environment.

Optionally, the depth map is indicative of an optical depth of a three-dimensional point represented by a given pixel in the at least one of the plurality of images, and wherein, when processing the at least one of the plurality of images based on the depth map, the at least one processor is configured to:

assign a three-dimensional location to the given pixel based on the optical depth of the three-dimensional point; and translate and rotate the three-dimensional location of the given pixel of the at least one of the plurality of images, based on said translational and rotational difference, to generate a corresponding pixel of the at least one derived image.

As the given pixel in the at least one of the plurality of images represents an actual physical point (or region) in the real-world environment, the three-dimensional point has a certain optical depth associated with it. As the depth map is indicative of optical depth information pertaining to the real-world environment, the depth map is indicative of the optical depth of said three-dimensional point.

Optionally, when the three-dimensional location is assigned to the given pixel, the three-dimensional location of the given pixel of the at least one of the plurality of images can be conveniently and accurately translated and rotated for generating the at least one derived image. Said translation and rotation is performed based on the translational and rotational difference between the user's head pose at the time of capturing a previous image and the user's head pose at the time of capturing a current image.

Optionally, the at least one of the plurality of images comprises a pair of stereo images, and wherein, when generating the depth map, the at least one processor is configured to match pixels of the pair of stereo images that represent a given three-dimensional point in the real-world environment and determine binocular disparities between matching pixels of the pair of stereo images. Notably, the pair of stereo images are usable to accurately determine an optical depth of the given three-dimensional point. In other words, the pair of stereo images are indicative of the optical depth of the given three-dimensional point. Therefore, matching those pixels of the pair of stereo images that represent the given three-dimensional point allow for accurately capturing and incorporating, into the depth map, the binocular disparities between matching pixels of the pair of stereo images. When such a depth map is used to generate the at least one derived image (and subsequently, the at least one next extended-reality image), the user is provided a realistic and accurate perception of depth in the visual scene of the extended-reality environment.

It will be appreciated that the pair of stereo images is captured by the at least one camera using the default exposure setting of the at least one camera.

Optionally, the display system further comprises a depth camera, wherein, when generating the depth map, the at least one processor is configured to control the depth camera to capture a depth image of the real-world environment from the position and orientation of the user's head with respect to which the at least one of the plurality of images is captured.

Notably, the depth image (namely, an image indicative of depth information of objects represented therein) of the real-world environment is captured from a same perspective as the perspective of the user at the time of capturing the at least one of the plurality of images. Therefore, the depth image and the at least one of the plurality of images represent substantially similar views of the real-world environment, while the depth image indicated additional depth information of said views. Examples of the depth camera include, but are not limited to, a digital camera, an RGB-D camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment.

Optionally, the at least one processor is configured to detect whether or not there are oversaturated pixels in any of the plurality of images, wherein the at least one underexposed image is captured when it is detected that there are oversaturated pixels in the at least one of the plurality of images. Herein, the term "oversaturated pixels" refers to pixels in the at least one of the plurality of images that have an exposure value greater than a predefined threshold exposure value. In such a case, the at least one underexposed image is captured only when it is detected that there are oversaturated pixels in the at least one of the plurality of images. The detection of whether or not there are oversaturated pixels in any of the plurality of images is performed using commonly used image processing techniques (for example, such as saturation mapping, saturation fixing algorithms, and the like). When none of the plurality of images have oversaturated pixels, a next image for the plurality of images is captured using the default exposure setting.

Optionally, the at least one processor is configured to adjust the exposure of the at least one camera to capture a given underexposed image of the real-world environment after a predefined number of images of the real-world environment are captured using the default exposure setting of the at least one camera. Optionally, in this regard, the at least one underexposed image is captured in a repeating manner. As an example, the plurality images may be captured by the at least one camera at a rate of 90 frames per second. In such a case, three underexposed images of the real-world environment may be captured every second, at equal predefined intervals. Notably, in such an example, an underexposed image may be captured after every 29 default-exposure images. Therefore, for 90 images captured in a given second, the 30th image, the 60th image, and the 90th image are underexposed images, whereas all the remaining images are default-exposure images.

Optionally, the at least one processor is configured to control the at least one camera to capture underexposed images of the real-world environment using a first under-exposure setting and a second underexposure setting of the at least one camera in an alternating manner. In this regard, the underexposed images are captured using two different low-exposure settings in an alternating manner. As a result, the change in exposure employed for capturing images of the real-world environment is gradual, and not sudden. Moreover, when the first and second underexposure settings are employed to capture the underexposed images, more exposure options are available to the at least one processor to choose from, for generating the at least one derived image.

As an example, the plurality images may be captured by the at least one camera at a rate of 90 frames per second. In such an example, an underexposed image may be captured after every 29 default-exposure images. In such an example, after a first set of 29 default-exposure images are captured, an underexposed image of the real-world environment may be captured using a first underexposure setting of the at least one camera. Thereafter, once a next set of 29 default-exposure images are captured, a second underexposed image of the real-world environment may be captured using a second underexposure setting of the at least one camera. Moreover, one another next set of 29 default-exposure images are captured, a third underexposed image of the real-world environment may be captured using the first underexposure setting of the at least one camera.

Optionally, the at least one processor is configured to:

adjust the exposure of the at least one camera to capture at least one overexposed image of the real-world environment, whilst processing corresponding head-tracking data obtained from the means for tracking the position and orientation of the user's head to determine a corresponding position and orientation of the user's head with respect to which the at least one overexposed image is captured;

process at least one previously-captured image, based on a translational and rotational difference between a position and orientation of the user's head with respect to which the at least one previously-captured image is captured and the position and orientation with respect to which the at least one overexposed image is captured, to generate at least one other derived image;

generate at least one other extended-reality image from the at least one other derived image using the environment map;

render, via the at least one display or projector, the at least one other extended-reality image; and identify pixel segments in the environment map that represent dark areas of the real-world environment and modify intensities of the identified pixel segments in the environment map, based on the at least one overexposed image and the position and orientation with respect to which the at least one overexposed image is captured.

Throughout the present disclosure, the term "overexposed image" refers to an image of the real-world environment that is captured to have an exposure that is greater than the default exposure with which the plurality of images are captured. Such an overexposed image depicts accurate detail of a dark portion within the real-world environment, which may not be clearly visible with the default exposure. Notably, a given image captured using the default exposure has a high amount of noise in a pixel segment that represents the dark portion. Moreover, optionally, the at least one overexposed image is later used to modify the environment map, thereby reducing the noise associated with the dark portion.

Optionally, as the corresponding position and orientation of the user's head with respect to which the at least one overexposed image is captured is determined, the at least one other derived image is accurately generated based on the translational and rotational difference between the user's head pose at the time of capturing the at least one previously-captured image and the user's head pose at the time of capturing the at least one overexposed image. When the at least one other derived image is subsequently used to generate the at least one other extended-reality image, the user does not experience video stuttering.

Optionally, the at least one other derived image is used to generate the other extended-reality view that is to be presented to the user. The other extended-reality view is generated using environment mapping in real time or near real time.

Optionally, pixel segments in the environment map that have an intensity level that is lower than a threshold low-intensity level are identified as the pixel segments in the environment map that represent dark areas of the real-world environment. Optionally, the intensities of the identified pixel segments in the environment map are updated to correspond to intensity values of corresponding pixels in the at least one overexposed image. When the at least one other derived image and the modified environment map are used to generate the at least one other extended-reality image, the at least one other extended-reality image clearly depicts visual details of the dark portion of the real-world environment.

It will be appreciated that the dark areas of the real-world environment are optionally regions that represent shadows within the real-world environment. Moreover, optionally, the dark areas of the real-world environment encompass dark-colored regions or dark-colored objects in the real-world environment.

Optionally, said identification of the pixel segments in the environment map and said modification of the intensities of the identified pixel segments in the environment map is performed parallelly while generating the at least one other derived image and the at least one other extended-reality image. Alternatively, optionally, said identification of the pixel segments in the environment map and said modification of the intensities of the identified pixel segments in the environment map is performed before the at least one other extended-reality image is generated, so that the at least one other extended-reality image is generated using the modified environment map.

The present disclosure also relates to the method as described above. Various embodiments and variants disclosed above apply mutatis mutandis to the method.

Optionally, the method further comprises processing eye-tracking data to detect when the user's eyes blink or saccade, wherein the at least one underexposed image is captured during a time period in which the user's eyes blink or saccade.

Optionally, the method further comprises generating a depth map of the real-world environment from a perspective of the position and orientation of the user's head with respect to which the at least one of the plurality of images is captured, wherein the at least one of the plurality of images is processed based on the depth map to generate the at least one derived image.

Optionally, in the method, the depth map is indicative of an optical depth of a three-dimensional point represented by a given pixel in the at least one of the plurality of images, and wherein the step of processing the at least one of the plurality of images to generate the at least one derived image comprises:

assigning a three-dimensional location to the given pixel based on the optical depth of the three-dimensional point; and translating and rotating the three-dimensional location of the given pixel of the at least one of the plurality of images, based on said translational and rotational difference, to generate a corresponding pixel of the at least one derived image.

Optionally, in the method, the at least one of the plurality of images comprises a pair of stereo images, and wherein the step of generating the depth map comprises:

matching pixels of the pair of stereo images that represent a given three-dimensional point in the real-world environment; and determining binocular disparities between matching pixels of the pair of stereo images.

Optionally, in the method, the step of generating the depth map comprises capturing, via a depth camera, a depth image of the real-world environment from the position and orientation of the user's head with respect to which the at least one of the plurality of images is captured.

Optionally, the method further comprises detecting whether or not there are oversaturated pixels in any of the plurality of images, wherein the at least one underexposed image is captured when it is detected that there are oversaturated pixels in the at least one of the plurality of images.

Optionally, the method further comprises adjusting the exposure of the at least one camera to capture a given underexposed image of the real-world environment after a predefined number of images of the real-world environment are captured using the default exposure setting of the at least one camera.

Optionally, the method further comprises capturing underexposed images of the real-world environment using a first underexposure setting and a second underexposure setting of the at least one camera in an alternating manner.

Optionally, the method further comprises:

adjusting the exposure of the at least one camera to capture at least one overexposed image of the real-world environment, whilst processing corresponding head-tracking data to determine a corresponding position and orientation of the user's head with respect to which the at least one overexposed image is captured;

processing at least one previously-captured image, based on a translational and rotational difference between a position and orientation of the user's head with respect to which the at least one previously-captured image is captured and the position and orientation with respect to which the at least one overexposed image is captured, to generate at least one other derived image;

generating at least one other extended-reality image from the at least one other derived image using the environment map;

rendering, via the at least one display or projector, the at least one other extended-reality image; and identifying pixel segments in the environment map that represent dark areas of the real-world environment and modifying intensities of the identified pixel segments in the environment map, based on the at least one overexposed image and the position and orientation with respect to which the at least one overexposed image is captured.

DETAILED DESCRIPTION OF THE DRAWINGS

Referring to FIG. 1, illustrated is a block diagram of architecture of a display system 100, in accordance with an embodiment of the present disclosure. The display system 100 comprises at least one display or projector (depicted as a display or projector 102), at least one camera (depicted as a camera 104), means 106 for tracking a position and orientation of a user's head, and at least one processor (depicted as a processor 108). The processor 108 is configured to:

control the camera 104 to capture a plurality of images of a real-world environment using a default exposure setting of the camera 104, whilst processing head-tracking data obtained from said means 106 to determine corresponding positions and orientations of the user's head with respect to which the plurality of images are captured;

process the plurality of images, based on the corresponding positions and orientations of the user's head, to create an environment map of the real-world environment;

generate at least one extended-reality image from at least one of the plurality of images using the environment map;

render, via the display or projector 102, the at least one extended-reality image;

adjust an exposure of the camera 104 to capture at least one underexposed image of the real-world environment, whilst processing corresponding head-tracking data obtained from said means 106 to determine a corresponding position and orientation of the user's head with respect to which the at least one underexposed image is captured;

process the at least one of the plurality of images, based on a translational and rotational difference between a position and orientation of the user's head with respect to which the at least one of the plurality of images is captured and the position and orientation with respect to which the at least one underexposed image is captured, to generate at least one derived image;

generate at least one next extended-reality image from the at least one derived image using the environment map;

render, via the display or projector 102, the at least one next extended-reality image; and identify oversaturated pixels in the environment map and modify intensities of the oversaturated pixels in the environment map, based on the at least one underexposed image and the position and orientation with respect to which the at least one underexposed image is captured.

Figure 2:
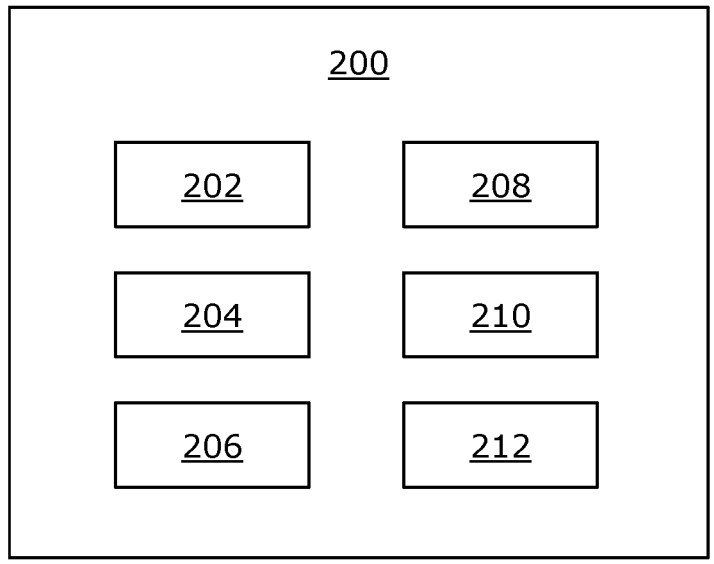

Referring to FIG. 2, illustrated is a block diagram of architecture of a display system 200, in accordance with an embodiment of the present disclosure. The display system 200 comprises at least one display or projector (depicted as a display or projector 202), at least one camera (depicted as a camera 204), means 206 for tracking a position and orientation of a user's head, and at least one processor (depicted as a processor 208). The display system 200 further comprises means 210 for tracking the user's eyes and a depth camera 212.

It may be understood by a person skilled in the art that FIG. 1 and FIG. 2 include simplified architectures of the display system 100 and 200, respectively, for sake of clarity, which should not unduly limit the scope of the claims herein. The person skilled in the art will recognize many variations, alternatives, and modifications of embodiments of the present disclosure.

Figure 3:
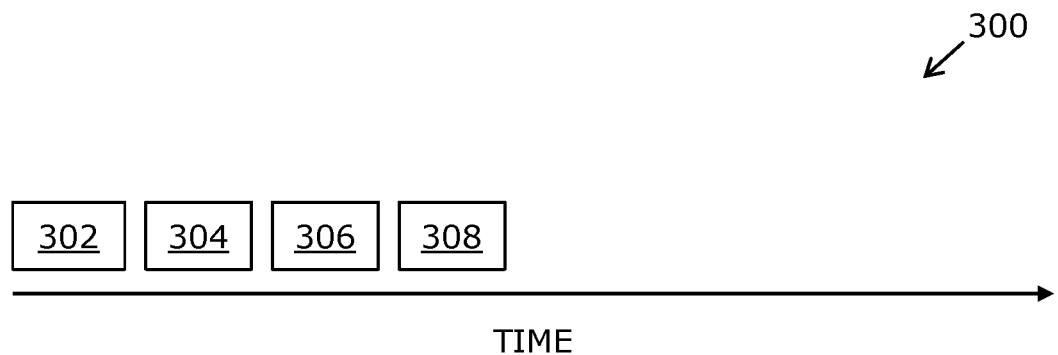
FIG. 3 is an exemplary timeline illustrating a sequence in which a plurality of images of a real-world environment are captured, in accordance with an embodiment of the present disclosure.

Referring to FIG. 3, illustrated is an exemplary timeline 300 depicting a sequence in which a plurality of images (depicted as images 302, 304, 306 and 308) of a real-world environment are captured, in accordance with an embodiment of the present disclosure. Notably, at least one processor (not shown) of a display system (not shown) is configured to control the at least one camera (not shown) to capture the images 302, 304, 306 and 308. When the at least one processor detects oversaturated pixels in any of the images 302, 304, 306 and 308, the at least one processor is configured to adjust an exposure of the at least one camera to capture at least one underexposed image of the real-world environment. As an example, if the image 304 is detected to have oversaturated pixels, the image 306 (namely, an image subsequent to the image 304) is captured using an underexposure setting of the at least one camera. In such an example, the images 302, 304 and 308 are captured using a default exposure setting of the at least one camera, whereas the image 306 is captured using the underexposure setting of the at least one camera.

The images that are captured using the default exposure setting of the at least one camera are used to generate extended-reality images to be rendered via at least one display or projector. As the underexposed image 306 cannot be used to generate an extended-reality image, the at least one processor generates a derived image from any of the previous images (preferably, the image 304) and generates an extended-reality image from the derived image.

Figure 4:
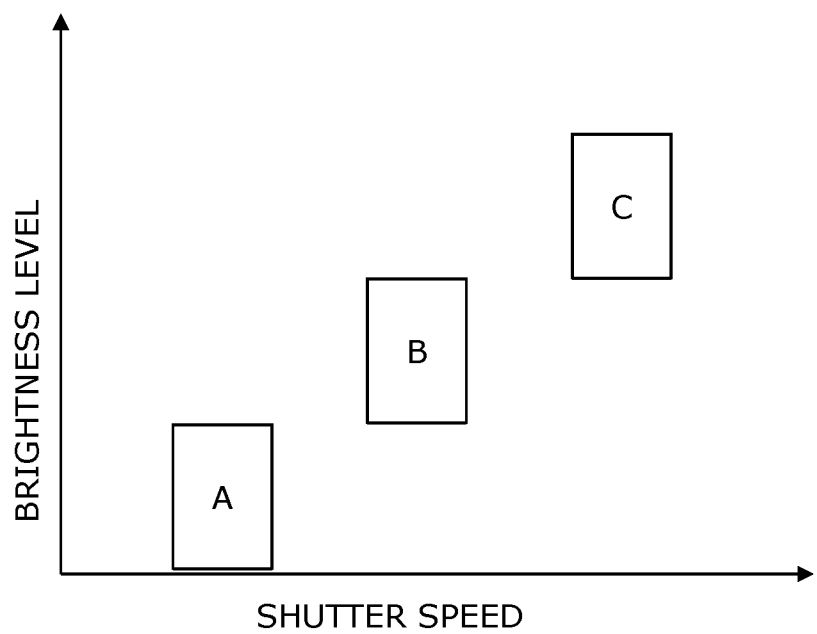
FIG. 4 is a graphical representation illustrating a relationship between brightness level of a real-world environment and exposure of a camera of a display system, in accordance with an embodiment of the present disclosure.

Referring to FIG. 4, illustrated is a graphical representation illustrating a relationship between brightness level of a real-world environment and exposure of a camera of a display system, in accordance with an embodiment of the present disclosure. In the graphical representation, variation of the exposure of the camera is shown in terms of variation of a shutter speed of the camera. Therefore, a horizontal axis of the graphical representation depicts the variation of the shutter speed of the camera of the display system and a vertical axis of the graphical representation depicts a variation of the brightness level of the real-world environment. Notably, when the brightness level of the real-world environment is low, the shutter speed is low (this is depicted by block A) since a required exposure to capture an image of the real-world environment is high. When the brightness level of the real-world environment is moderate, the shutter speed is medium (this is depicted by block B) since the required exposure to capture the image of the real-world environment is medium. When the brightness level of a real-world environment is high, the shutter speed is high (this is depicted by block C) since the required exposure to capture the image of the real-world environment is low.

Figure 5A:
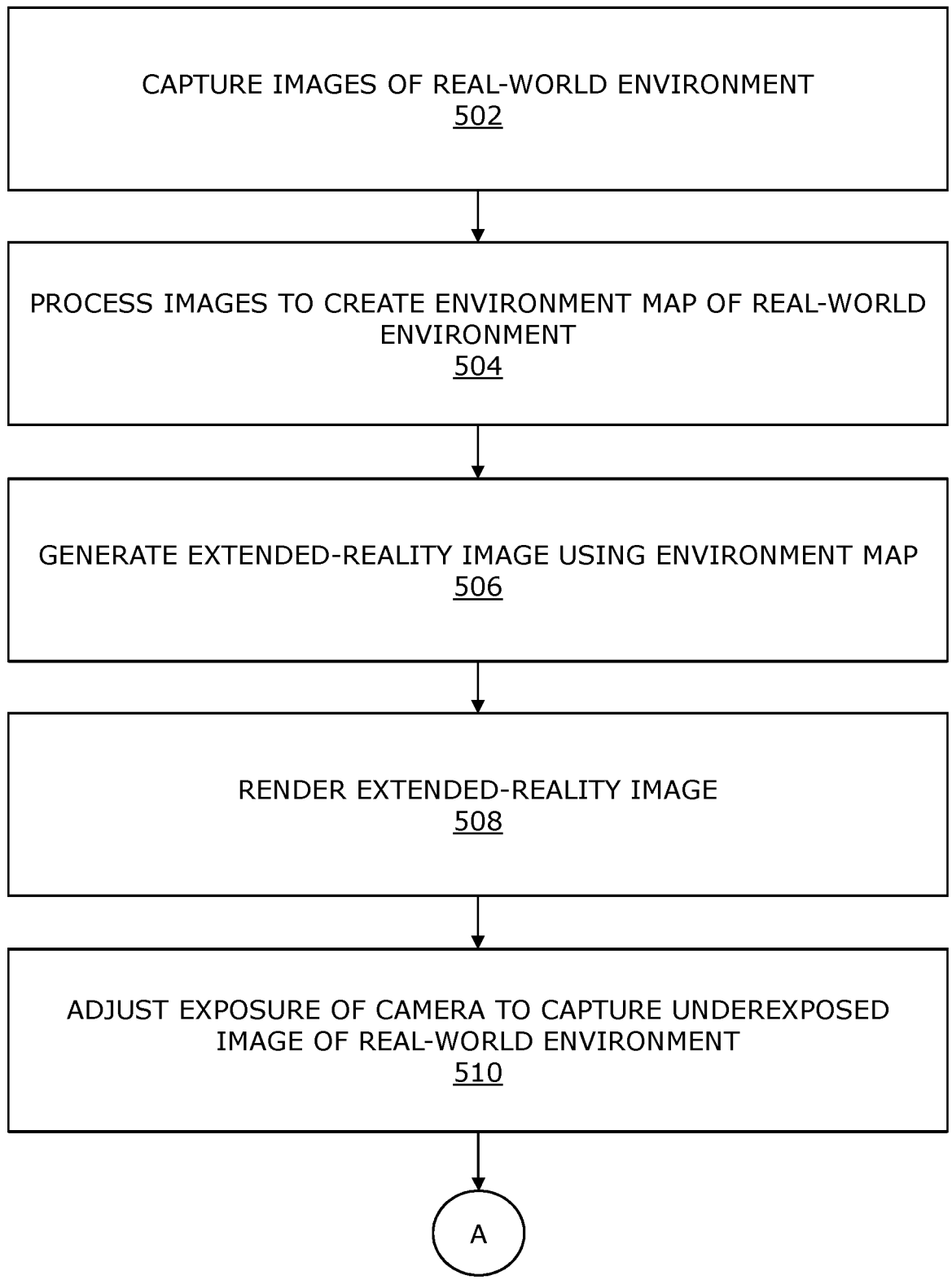
FIGS. 5A and 5B illustrate steps of a method, in accordance with an embodiment of the present disclosure.
Figure 5B:
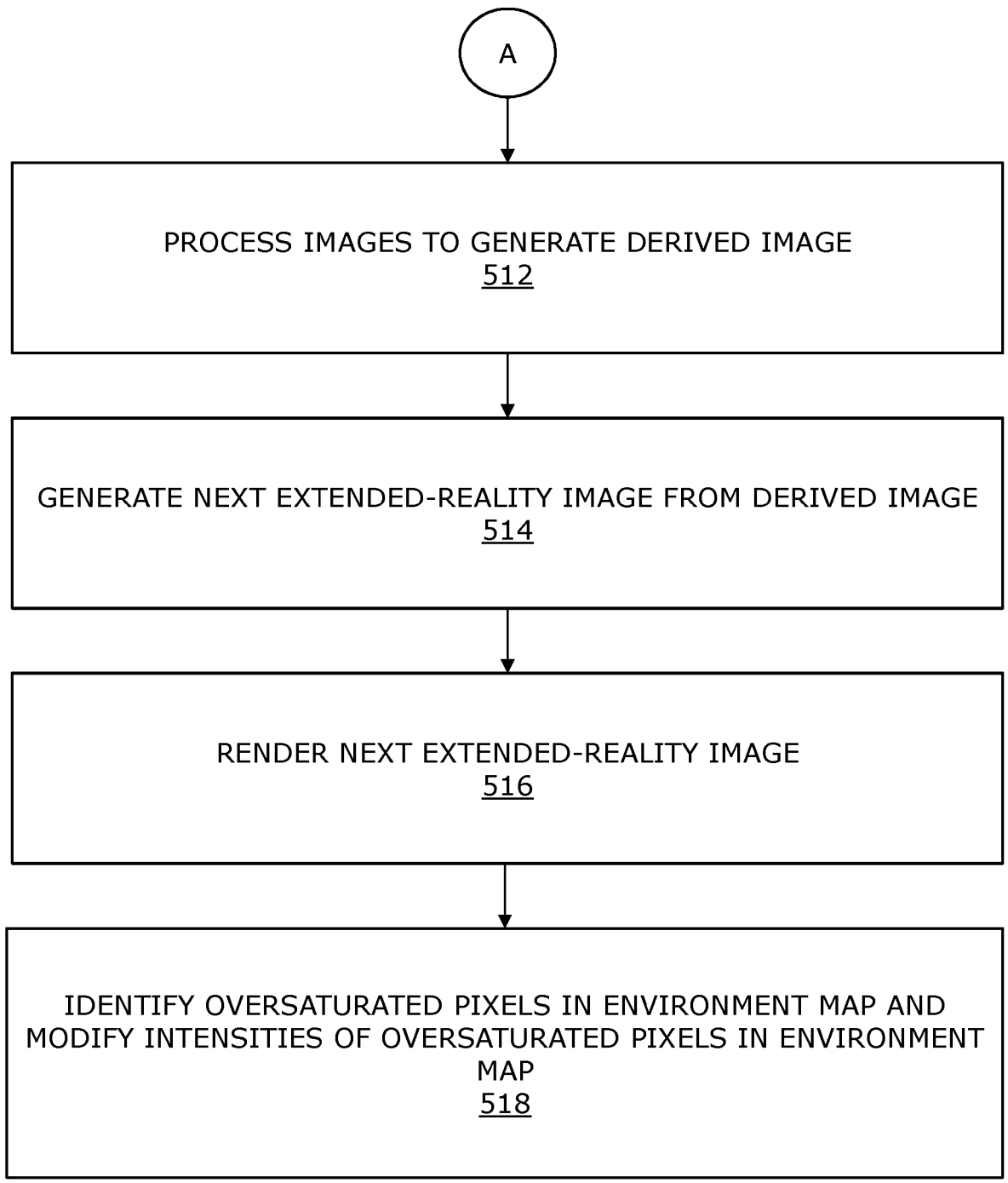

Referring to FIGS. 5A and 5B, illustrated are steps of a method, in accordance with an embodiment of the present disclosure. At a step 502, a plurality of images of a real-world environment is captured using a default exposure setting of at least one camera, whilst processing head-tracking data to determine corresponding positions and orientations of a user's head with respect to which the plurality of images are captured. At a step 504, the plurality of images is processed, based on the corresponding positions and orientations of the user's head, to create an environment map of the real-world environment. At a step 506, at least one extended-reality image is generated from at least one of the plurality of images using the environment map. At a step 508, the at least one extended-reality image is rendered via at least one display or projector. At a step 510, an exposure of the at least one camera is adjusted to capture at least one underexposed image of the real-world environment, whilst processing corresponding head-tracking data to determine a corresponding position and orientation of the user's head with respect to which the at least one underexposed image is captured. At a step 512, the at least one of the plurality of images are processed, based on a translational and rotational difference between a position and orientation of the user's head with respect to which the at least one of the plurality of images is captured and the position and orientation with respect to which the at least one underexposed image is captured, to generate at least one derived image. At a step 514, at least one next extended-reality image is generated from the at least one derived image using the environment map. At a step 516, the at least one next extended-reality image is rendered via the at least one display or projector. At a step 518, oversaturated pixels in the environment map are identified and intensities of the oversaturated pixels in the environment map are modified, based on the at least one underexposed image and the position and orientation with respect to which the at least one underexposed image is captured.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display system comprising:
   at least one display or projector;
   at least one camera;
   means for tracking a position and orientation of a user's head; and
   at least one processor configured to:
   control the at least one camera to capture a plurality of images of a real-world environment using a default exposure setting of the at least one camera, whilst processing head-tracking data obtained from said means to determine corresponding positions and orientations of the user's head with respect to which the plurality of images are captured;
   process the plurality of images, based on the corresponding positions and orientations of the user's head, to create an environment map of the real-world environment;
   generate at least one extended-reality image from at least one of the plurality of images using the environment map;
   render, via the at least one display or projector, the at least one extended-reality image;
   adjust an exposure of the at least one camera to capture at least one underexposed image of the real-world environment, whilst processing corresponding head-tracking data obtained from said means to determine a corresponding position and orientation of the user's head with respect to which the at least one underexposed image is captured;
   process the at least one of the plurality of images, based on a transitional and rotational difference between a position and orientation of the user's head with respect to which the at least one of the plurality of images is captured and the position and orientation with respect to which the at least one underexposed image is captured, to generate at least one derived image;
   generate at least one next extended-reality image from the at least one derived image using the environment map;
   render, via the at least one display or projector, the at least one next extended-reality image; and
   identify oversaturated pixels in the environment map and modify intensities of the oversaturated pixels in the environment map, based on the at least one underexposed image and the position and orientation with respect to which the at least one underexposed image is captured,
   wherein the at least one processor is configured to detect whether or not there are oversaturated pixels in any of the plurality of images, and wherein the at least one underexposed image is captured when it is detected that there are oversaturated pixels in the at least one of the plurality of images.

2. The display system of claim 1, further comprising means for tracking the user's eyes, wherein the at least one processor is configured to process eye-tracking data obtained from said means to detect when the user's eyes blink or saccade, wherein the at least one underexposed image is to be captured during a time period in which the user's eyes blink or saccade.

3. The display system of claim 1, wherein the at least one processor is configured to generate a depth map of the real-world environment from a perspective of the position and orientation of the user's head with respect to which the at least one of the plurality of images is captured, and wherein, when generating the at least one derived image, the at least one processor is configured to process the at least one of the plurality of images based on the depth map.

4. The display system of claim 3, wherein the depth map is indicative of an optical depth of a three-dimensional point represented by a given pixel in the at least one of the plurality of images, and wherein, when processing the at least one of the plurality of images based on the depth map, the at least one processor is configured to:
  assign a three-dimensional location to the given pixel based on the optical depth of the three-dimensional point;
  translate and rotate the three-dimensional location of the given pixel of the at least one of the plurality of images, based on said translational and rotational difference, to generate a corresponding pixel of the at least one derived image.

5. The display system of claim 3, wherein the at least one of the plurality of images comprises a pair of stereo images, and wherein, when generating the depth map, the at least one processor is configured to match pixels of the pair of stereo images that represent a given three-dimensional point in the real-world environment and determine binocular disparities between matching pixels of the pair of stereo images.

6. The display system of claim 3, further comprising a depth camera, wherein, when generating the depth map, the at least one processor is configured to control the depth camera to capture a depth image of the real-world environment from the position and orientation of the user's head with respect to which the at least one of the plurality of images is captured.

7. The display system of claim 1, wherein the at least one processor is configured to adjust the exposure of the at least one camera to capture a given underexposed image of the real-world environment after a predefined number of images of the real-world environment are captured using the default exposure setting of the at least one camera.

8. The display system of claim 1, wherein the at least one processor is configured to control the at least one camera to capture underexposed images of the real-world environment using a first underexposure setting and a second underexposure setting of the at least one camera in an alternating manner.

9. The display system of claim 1, wherein the at least one processor is configured to:
  adjust the exposure of the at least one camera to capture at least one overexposed image of the real-world environment, whilst processing corresponding head-tracking data obtained from the means for tracking the position and orientation of the user's head to determine a corresponding position and orientation of the user's head with respect to which the at least one overexposed image is captured;
  process at least one previously-captured image, based on a transitional and rotational difference between a position and orientation of the user's head with respect to which the at least one previously-captured image is captured and the position and orientation with respect to which the at least one overexposed image is captured, to generate at least one other derived image;
  generate at least one other extended-reality image from the at least one other derived image using the environment map;
  render, via the at least one display or projector, the at least one other extended-reality image; and
  identify pixel segments in the environment map that represent dark areas of the real-world environment and modify intensities of the identified pixel segments in the environment map, based on the at least one overexposed image and the position and orientation with respect to which the at least one overexposed image is captured.

10. A method comprising:
  capturing a plurality of images of a real-world environment using a default exposure setting of at least one camera, whilst processing head-tracking data to determine corresponding positions and orientations of a user's head with respect to which the plurality of images are captured;
  processing the plurality of images, based on the corresponding positions and orientations of the user's head, to create an environment map of the real-world environment;
  generating at least one extended-reality image from at least one of the plurality of images using the environment map;
  rendering, via at least one display or projector, the at least one extended-reality image;
  adjusting an exposure of the at least one camera to capture at least one underexposed image of the real-world environment, whilst processing corresponding head-tracking data to determine a corresponding position and orientation of the user's head with respect to which the at least one underexposed image is captured;
  processing the at least one of the plurality of images, based on a translational and rotational difference between a position and orientation of the user's head with respect to which the at least one of the plurality of images is captured and the position and orientation with respect to which the at least one underexposed image is captured, to generate at least one derived image;
  generating at least one next extended-reality image from the at least one derived image using the environment map;
  rendering, via the at least one display or projector, the at least one next extended-reality image;
  identifying oversaturated pixels in the environment map and modifying intensities of the oversaturated pixels in the environment map, based on the at least one underexposed image and the position and orientation with respect to which the at least one underexposed image is captured; and
  detecting whether or not there are oversaturated pixels in any of the plurality of images, wherein the at least one underexposed image is captured when it is detected that there are oversaturated pixels in the at least one of the plurality of images.

11. The method of claim 10, further comprising processing eye-tracking data to detect when the user's eyes blink or saccade, wherein the at least one underexposed image is captured during a time period in which the user's eyes blink or saccade.

12. The method of claim 10, further comprising generating a depth map of the real-world environment from a perspective of the position and orientation of the user's head with respect to which the at least one of the plurality of images is captured, wherein the at least one of the plurality of images is processed based on the depth map to generate the at least one derived image.

13. The method of claim 12, wherein the depth map is indicative of an optical depth of a three-dimensional point represented by a given pixel in the at least one of the plurality of images, and wherein the step of processing the at least one of the plurality of images to generate the at least one derived image comprises:
   assigning a three-dimensional location to the given pixel based on the optical depth of the three-dimensional point;
   translating and rotating the three-dimensional location of the given pixel of the at least one of the plurality of images, based on said translational and rotational difference, to generate a corresponding pixel of the at least one derived image.

14. The method of claim 12, wherein the at least one of the plurality of images comprises a pair of stereo images, and wherein the step of generating the depth map comprises:
   matching pixels of the pair of stereo images that represent a given three-dimensional point in the real-world environment; and
   determining binocular disparities between matching pixels of the pair of stereo images.

15. The method of claim 12, wherein the step of generating the depth map comprises capturing, via a depth camera, a depth image of the real-world environment from the position and orientation of the user's head with respect to which the at least one of the plurality of images is captured.

16. The method of claim 10, further comprising adjusting the exposure of the at least one camera to capture a given underexposed image of the real-world environment after a predefined number of images of the real-world environment are captured using the default exposure setting of the at least one camera.

17. The method of claim 10, further comprising capturing underexposed images of the real-world environment using a first underexposure setting and a second underexposure setting of the at least one camera in an alternating manner.

18. The method of claim 10, further comprising:
   adjusting the exposure of the at least one camera to capture at least one overexposed image of the real-world environment, whilst processing corresponding head-tracking data to determine a corresponding position and orientation of the user's head with respect to which the at least one overexposed image is captured;
   processing at least one previously-captured image, based on a translational and rotational difference between a position and orientation of the user's head with respect to which the at least one previously-captured image is captured and the position and orientation with respect to which the at least one overexposed image is captured, to generate at least one other derived image;
   generating at least one other extended-reality image from the at least one other derived image using the environment map;
   rendering, via the at least one display or projector, the at least one other extended-reality image; and
   identifying pixel segments in the environment map that represent dark areas of the real-world environment and modifying intensities of the identified pixel segments in the environment map, based on the at least one overexposed image and the position and orientation with respect to which the at least one overexposed image is captured.

* * * * *